United States Patent [19]
Stafford et al.

[11] 4,183,559
[45] Jan. 15, 1980

[54] PIGGABLE FLUID SWIVEL

[75] Inventors: Donald C. Stafford, Hinsdale; John S. Andrepont, Lisle, both of Ill.

[73] Assignee: Chicago Bridge & Iron Company, Oak Brook, Ill.

[21] Appl. No.: 875,592

[22] Filed: Feb. 6, 1978

[51] Int. Cl.² ............................................. F16L 27/08
[52] U.S. Cl. ............................. 285/190; 15/104.06 R; 285/281; 285/136; 285/93
[58] Field of Search ................ 15/104.05, 104.06 R; 285/136, 190, 98, 93, 134, 272, 273, 274, 275, 276, 277, 278, 279, 280, 281, 282; 9/8 P; 141/387

[56] References Cited
U.S. PATENT DOCUMENTS

| | | | |
|---|---|---|---|
| 3,026,129 | 3/1962 | Courtot et al. | 285/272 X |
| 3,351,360 | 11/1967 | Follow | 285/190 X |
| 3,698,433 | 10/1972 | Dobler | 285/136 X |
| 3,838,718 | 10/1974 | Flory et al. | 285/136 X |
| 4,052,090 | 10/1977 | Stafford | 285/136 X |
| 4,065,159 | 12/1977 | Leroy | 285/136 |

*Primary Examiner*—Dave W. Arola
*Attorney, Agent, or Firm*—Merriam, Marshall & Bicknell

[57] ABSTRACT

A fluid-swivel with a first member having a first face, a second member having a second face adjoining and mating with the first face of the first member, the first face and the second face being positioned to rotate relative to each other about a common axis, a fluid conduit defined by a first raceway in the first face and a second raceway in the second face opposite the first raceway when the first and second raceways are at a predetermined index point relative to each other, said fluid conduit at the indexed condition defining a path in one revolution about the common axis which advances the conduit a distance of at least one width of the conduit, an inlet conduit communicating with the fluid conduit, and an outlet conduit communicating with the fluid conduit.

28 Claims, 13 Drawing Figures

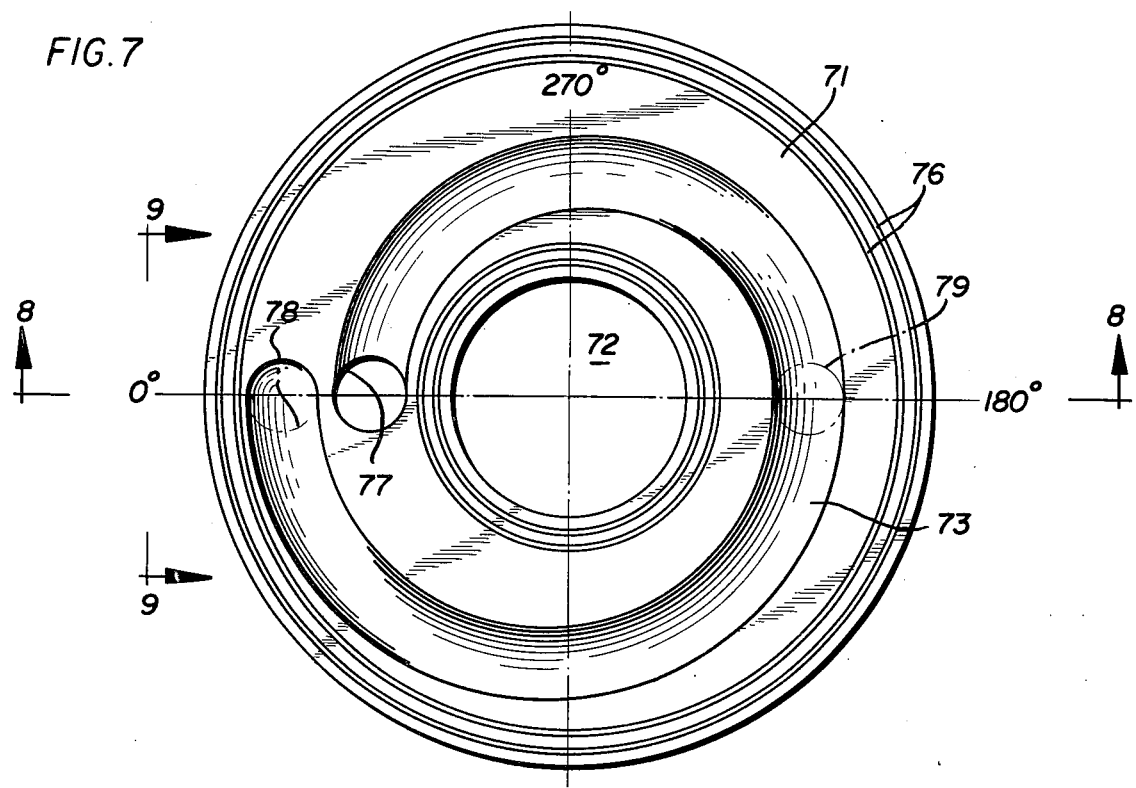
FIG. 7
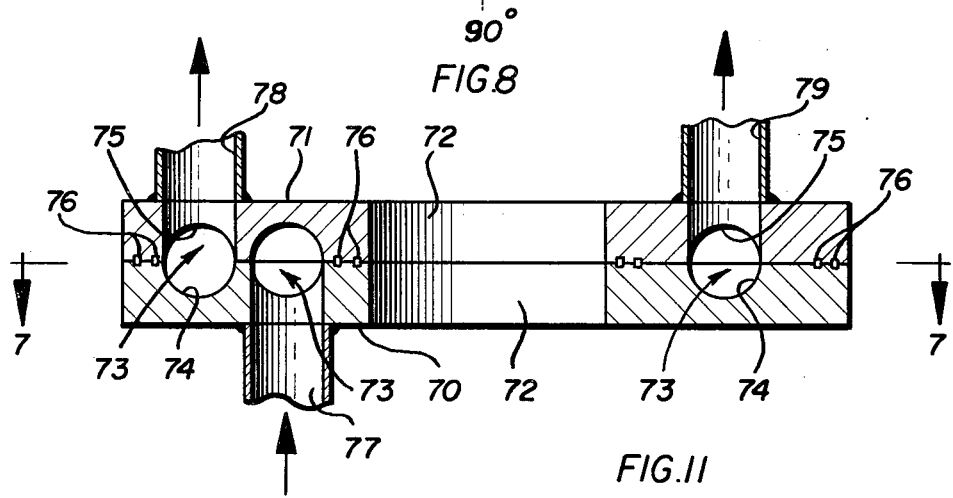
FIG. 8
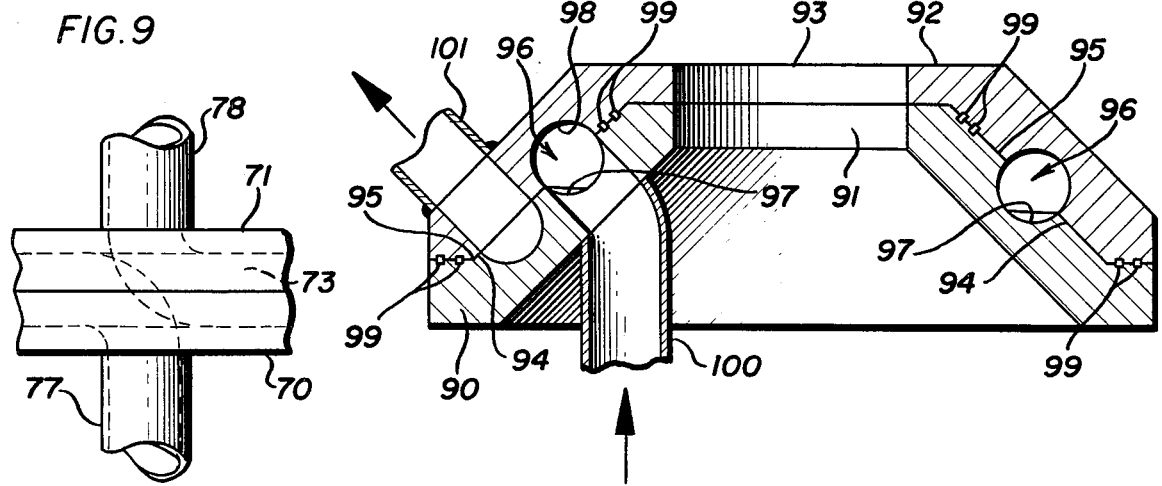
FIG. 9
FIG. 11

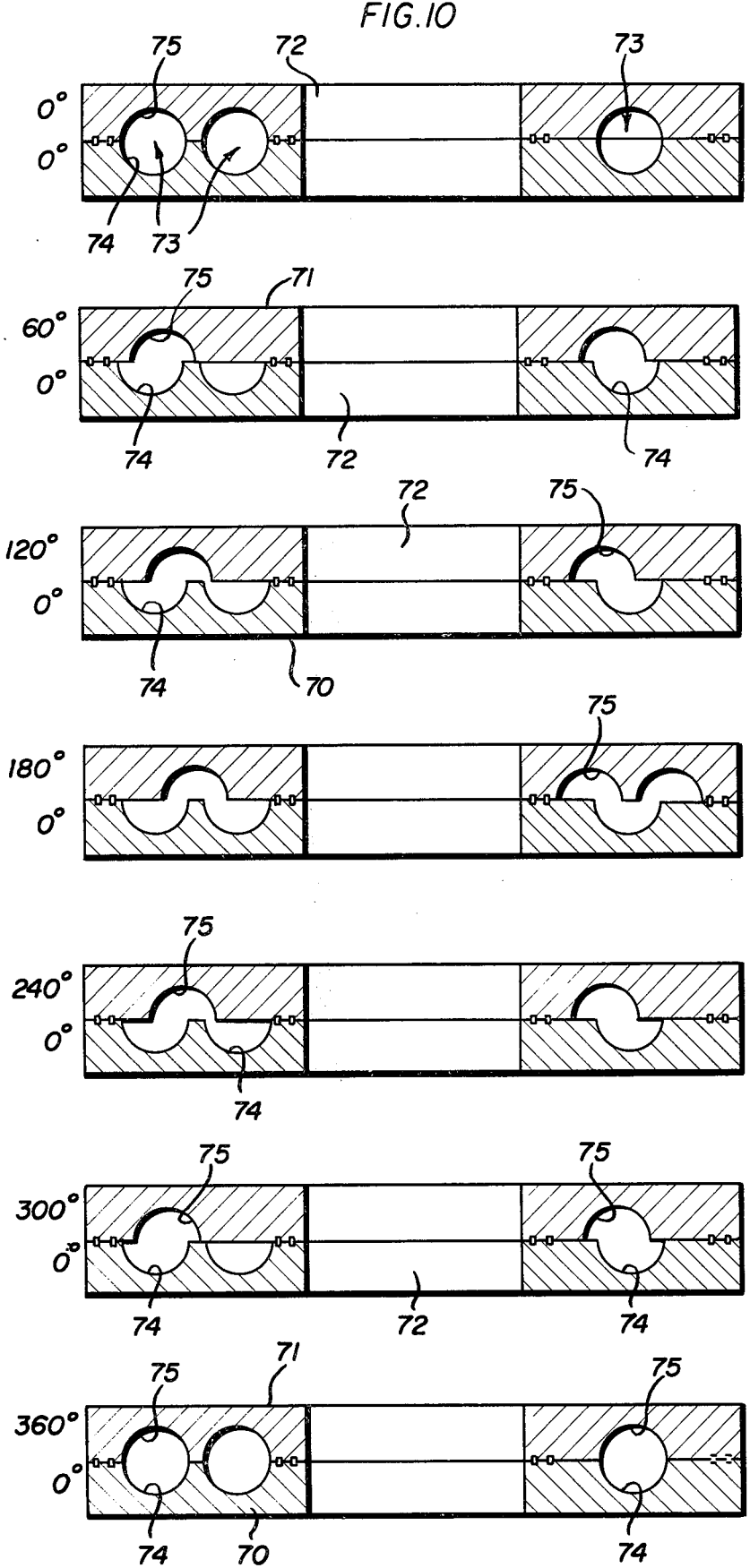

PIGGABLE FLUID SWIVEL

This invention relates to a rotary or swivel joint for fluid flow. More particularly, the invention is concerned with a fluid-swivel which is piggable for use in loading and unloading a tanker offshore.

The loading and unloading of ocean-going tankers moored at offshore locations has become common. Many such moorings comprise a fixed or buoyant offshore terminal to which the tanker is secured by a suitable bow attachment which permits the vessel to swing in a complete circle about the terminal in response to the forces of wind, sea currents and tide. See U.S. Pat. Nos. 3,074,082; 3,077,615; 3,817,355 and 3,614,869. One or more conduits leading from the terminal to the tanker permit the tanker to be loaded or unloaded with a variety of liquids, including crude oil.

In order to permit the tanker to swing around the terminal, each conduit must be equipped with a swivel joint. Swivel joints of various types are known in the art. See U.S. Pat. Nos. 4,052,090; 3,698,433; 3,614,869; 3,430,670; 3,351,360; 3,082,440 and 2,894,268.

Crude oils are widely loaded and unloaded through fluid-swivels on offshore terminals. Many of the crude oils contain solid materials, such as wax or asphalt, which stick to the walls of the pipes feeding oil to and from the fluid-swivel, as well as in the conduits in the fluid swivel itself. Unless these solid deposits are removed, the effective internal diameter of the pipes and fluid-swivel will be reduced so much that fluid flow is seriously impeded, even to the point of total blockage. It is customary in the oil industry to force a pig through pipelines to remove solids deposited in them. However, present fluid-swivels and associated piping are not designed to be piggable, and will not permit a pig to travel through, so that cleaning them of deposits involves a costly and time consuming disassembly and reassembly operation. There is thus a need for a piggable fluid-swivel which can be used on an offshore tanker mooring terminal.

According to the invention, there is provided a piggable fluid-swivel comprising a first member having a first face, a second member having a second face adjoining and mating with the first face of the first member, the first face and the second face being positioned to rotate relative to each other about a common axis, a spiral conduit defined by a first raceway in the first face and a second raceway in the second face opposite the first raceway when the first and second raceways are at a predetermined index point relative to each other, said fluid conduit at the indexed condition defining a path in one revolution about the common axis which advances the conduit a distance of at least one width of the conduit, an inlet conduit communicating with the fluid conduit, and an outlet conduit communicating with the fluid conduit.

Regardless of whether the first member or the second member is stationary and the other is rotated, there is continuous communication between the raceways on the drum first and second members so that fluid can flow from the inlet conduit, through the fluid-swivel, and to the outlet conduit, at all positions through 30° rotation of the first member or second member relative to the other. The fluid-swivel, however, is only piggable when the first and second members are located in or about in the indexed condition or position which provides a smooth bore fluid conduit, such as one circular in cross-section. When the first and second members are properly indexed, a pig can readily enter the fluid-swivel, continue through the fluid conduit, and exit through the outlet conduit. The construction of the fluid-swivel prevents the pig from going in an endless circle in it and avoids ports which could bind the pig in place or direct it back to the inlet conduit.

The fluid-swivel can take several forms which are related structurally. Thus, the first member can be a drum and the second member can be a ring which surrounds the drum. The fluid conduit can be partially in the ring and partially in the drum. The fluid-swivel can also be formed of two plates, one on top of the other with the fluid conduit partially in each plate. Structurally intermediate to these two embodiments is a third embodiment in which the first and second faces of the members are matching conical surfaces which contain raceways defining the fluid conduit. Regardless of the shape of the faces, a seal is generally located on each side of the liquid conduit to restrain liquid flow between the mating or matching faces.

The fluid conduit formed by the first and second faces is advisably a spiral or helix with a uniform pitch or curve from inlet to outlet. However, the fluid conduit can have a non-uniform pitch from inlet to outlet. Thus, the fluid conduit can have a stepped portion which displaces the path of the fluid conduit from a smooth curve or arc.

To facilitate movement of a pig into and out of the fluid-swivel, the inlet and outlet conduits are made circular and with a diameter substantially the same as the diameter of the fluid conduit.

The flow of fluid through the fluid-swivel is sometimes further facilitated by providing a second outlet located about 180° from the first outlet and with the second outlet about normal to the fluid conduit at that location. By having the second outlet normal to the fluid conduit a pig is unlikely to become stuck in it. However, when the fluid-swivel is to be pigged, this second outlet can be plugged and the fluid conduit thereby made smooth for uninterrupted passage of the pig.

It is further desired to have the inlet conduit, and outlet conduit, communicate tangentially with the fluid conduit.

A preferred embodiment of piggable fluid-swivel provided by the invention comprises a drum having a peripheral circular wall, a raceway in, and extending completely around, the circumference of the drum wall, a ring coaxially positioned around the drum and having an internal circular wall in mating contact around the drum wall, the drum or the ring being in stationary position during fluid flow and the other being rotatable relative to it, a raceway in, and extending completely around, the ring internal wall, the raceways in the drum and the ring being opposite and matching each other when the drum and ring are at a predetermined index point relative to each other thereby forming a fluid conduit circular in radial vertical section through the drum and ring, said fluid conduit at the indexed condition defining a path in one revolution which advances the conduit a distance of at least one conduit diameter in a direction axial to the drum and ring, an inlet conduit communicating with the fluid conduit, and an outlet conduit communicating with the fluid conduit.

The fluid conduit formed by the drum and ring raceways is advisably a spiral or helix with a uniform pitch from inlet to outlet. However, the fluid conduit can have a non-uniform pitch from inlet to outlet. Thus, the fluid conduit can have a stepped-up portion which displaces the path of the fluid conduit about one diameter about the drum and swivel coaxis. Except for the stepped-up portion, the remainder of the fluid conduit would lie in two spaced apart planes, perpendicular to the coaxis of the drum and ring. The stepped-up portion is desirably located in an angle of about 270°, and advisably about 180°, defined by radii of the drum and ring coaxis.

Although the drum and ring mating walls may be sloped or conical sections, it is preferable to have the mating walls parallel to the drum and ring axis as circular cylindrical surfaces.

The invention will be described further in conjunction with the attached drawings, in which:

FIG. 7 is a plan view of a fluid-swivel having a horizontal fluid conduit formed by two plates;

FIG. 8 is a sectional view taken along the line 8—8 of FIG. 7;

FIG. 9 is a side view taken along the line 9—9 of FIG. 7;

FIG. 10 is a schematic drawing illustrating the shape the fluid conduit takes in the embodiment of FIGS. 7 to 9 when one plate rotates relative to the other;

FIG. 11 is a sectional view like FIG. 8 but of a third embodiment in which the fluid conduit is a spiral partially in each of two opposing conical faces or surfaces;

So far as is practical, the same elements or parts which appear in the different views comprising the drawings will be identified by the same numbers.

Figure 1:
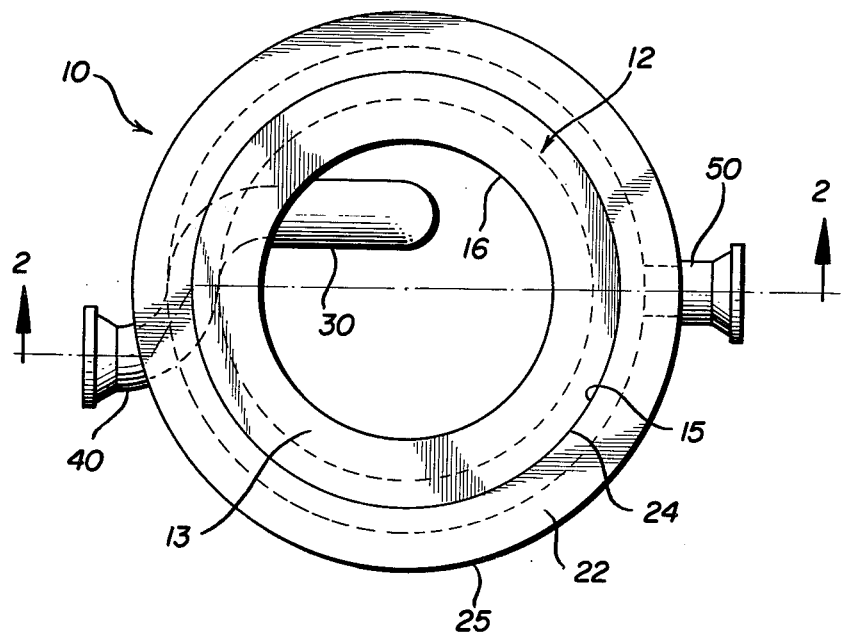
FIG. 1 is a plan view of one embodiment of fluid-swivel provided by this invention.

The fluid-swivel 10 embodiment of FIGS. 1 to 4 is mounted on a support base 11 which can be located on an offshore tanker loading or unloading terminal which permits a tanker moored to it to rotate 360°. The fluid swivel 10 has a stationary drum 12 fixedly joined to support base 11. Drum 12 has parallel top and bottom surfaces 13 and 14, an outer peripheral vertical circular wall 15 and an inner vertical circular wall 16.

Raceway 17 in the form of a helix is located in, and extends completely around, the circumference of drum wall 15. The raceway 17 is semi-circular in radial vertical section through the drum with the diameter of the raceway located in the surface of drum wall 15. The slope of helical raceway 17 is slightly more than one raceway diameter per revolution of the drum, thereby providing a landing 18 (FIG. 2) between the beginning and the end of the raceway.

Ring 21 is coaxially positioned around drum 12. Ring 21 has top and bottom spaced-apart horizontal surfaces 22 and 23, an internal vertical circular wall 24 and an external vertical circular wall 25. Ring 21 is rotatably supported by rollers 26 mounted at the top of support base 11. The ring internal wall 24 fits in mating contact with drum external wall 15. Helical raceway 27 is located in, and extends completely around, the ring internal wall 24. Raceway 27 is semi-circular in radial vertical section through ring 21 with the diameter of the raceway located in the surface of ring wall 24. The pitch of raceway 27 is the same as the pitch of raceway 17. When the fluid-swivel is in indexed position, as shown in FIGS. 1 to 4, the ring raceway 27 of the drum raceway 17 will be precisely opposite each other and together they form a fluid conduit 28 circular in cross-section through which a pig can travel unobstructed.

Figure 2:
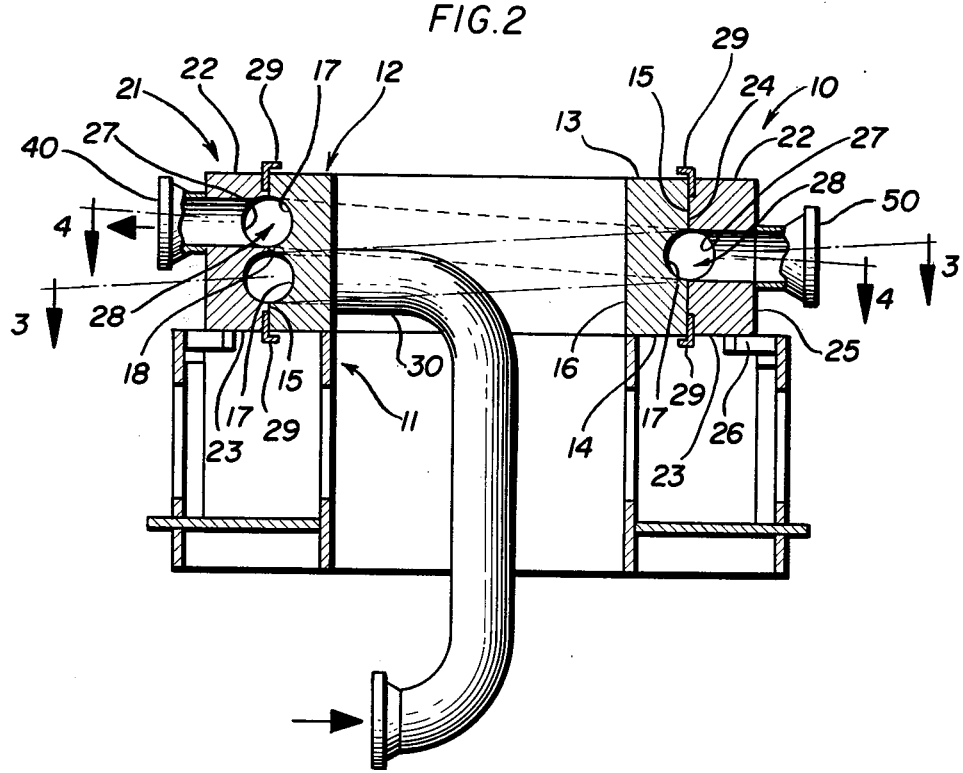
FIG. 2 is a vertical sectional view taken along the line 2—2 of FIG. 1.
Figure 4:
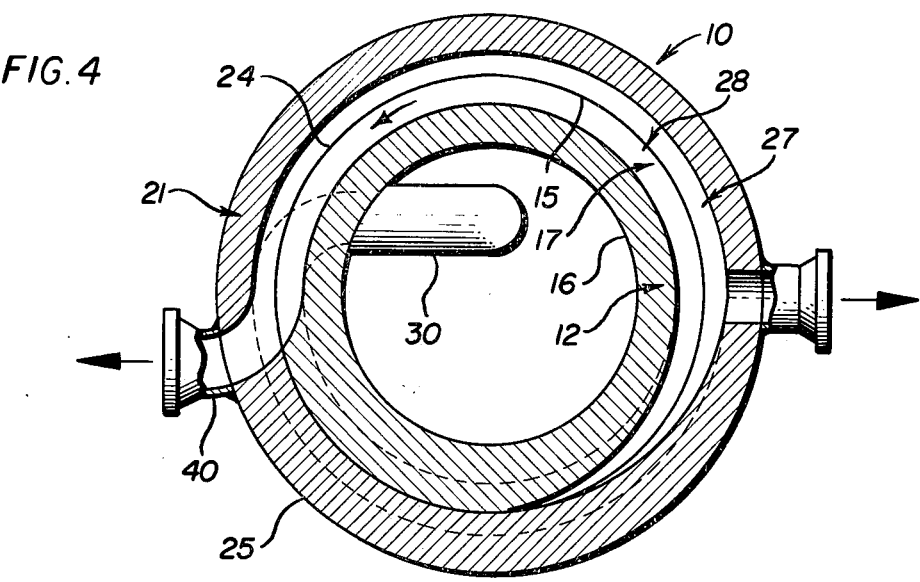
FIG. 4 is a sectional view taken along the line 4—4 of FIG. 2.
Figure 3:
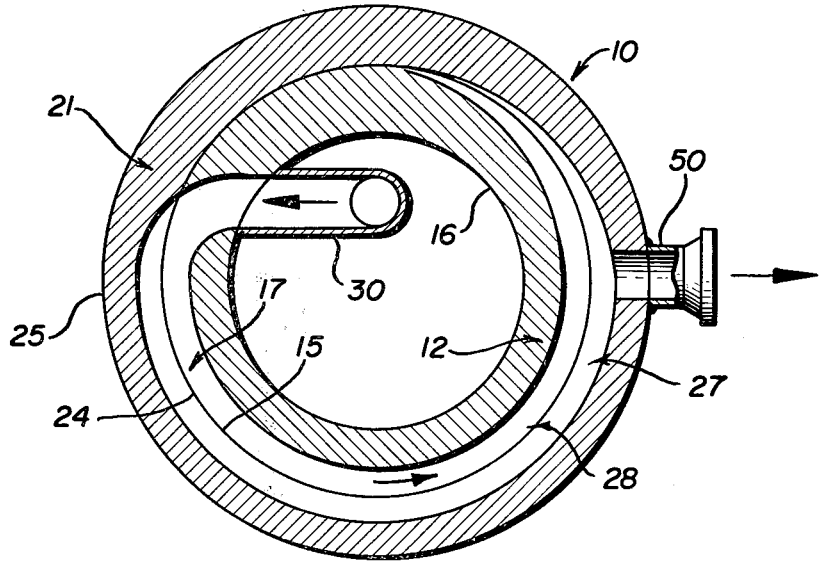
FIG. 3 is a sectional view taken along the line 3—3 of FIG. 2.

Packing glands 29, shown schematically in FIG. 2, hold sealing material in place to prevent or restrain fluid flow between the mating drum and ring walls and out of the fluid-swivel.

The fluid-swivel 10 of FIGS. 1 to 4 has an inlet conduit 30 which communicates tangentially with the fluid conduit 28. In addition, the fluid-swivel 10 has an outlet conduit 40 communicating tangentially with the fluid conduit 28 but in an opposite direction to the inlet conduit 30, at the index point or position. This tangential arrangement of the inlet and outlet conduits permits a pig to readily go in the fluid conduit 28 as well as out of it.

Figure 5:
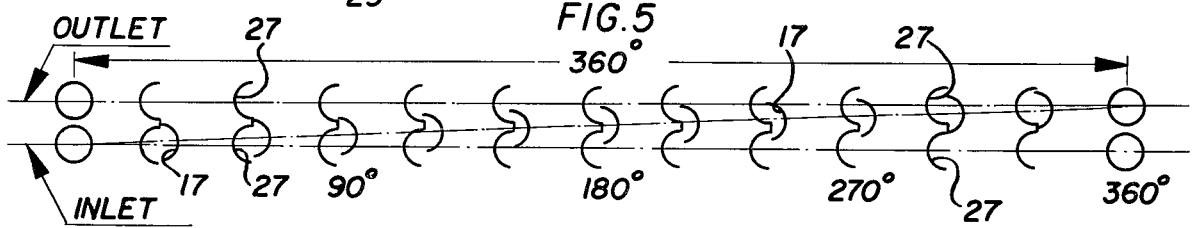
FIG. 5 is a schematic drawing illustrating the shape of the fluid conduit in the embodiment of FIGS. 1 to 4 with the drum stationary and containing the inlet conduit, and the ring rotatable and containing the outlet conduit.

FIG. 5 shows schematically the relationship of the profile of the ring raceway 27 taken at the outlet conduit to the drum raceway 17 as the ring 21 is rotated counter-clockwise when viewed in plan as shown in FIG. 1. FIG. 5 also shows the relationship of the raceways when the outlet conduit profile of the ring raceway is located at various angles of rotation away from the index position, thus establishing that there can be fluid flow along the raceways no matter where the ring is positioned around the drum. There will be, as shown in FIG. 5, a cross-over of fluid between the upper and lower parts of the ring raceway 27 where it spans the drum raceway 17. This may lead to turbulent fluid flow which can be reduced by including a second fluid outlet 50 in normal communication to the fluid conduit 28. The second outlet 50 is desirably located about 180° from the first outlet 40. When the fluid-swivel is to be pigged, second outlet 50 is advisably plugged so that the pig cannot be deflected into that outlet instead of continuing on its route to the first outlet.

It will be apparent that if reverse fluid flow and pigging in the fluid-swivel 10 is desired that outlet 40 may be made an inlet, and inlet 30 may be made an outlet.

Figure 6:
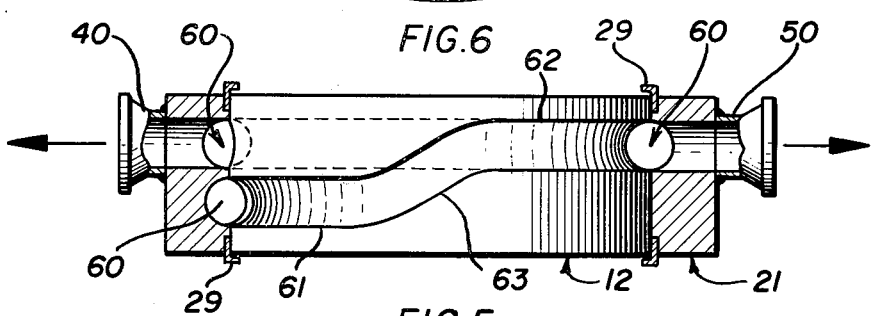
FIG. 6 is a vertical sectional view, similar to FIG. 2, but showing a second embodiment of fluid-swivel having a stepped-up fluid conduit.

FIG. 6 illustrates a second embodiment of the invention which differs from the embodiment shown in FIGS. 1 to 4 only in the path of the fluid conduit 60. The fluid conduit 60 has two portions 61 and 62 which lie in two spaced-apart planes perpendicular to the coaxis of the drum 12 and ring 21 and these portions are joined by a smoothly curved stepped-up portion 63 which can be readily traversed by a pig. The stepped-up portion extends less than 180° around the swivel. The complementary mirror-image raceways in the drum and ring form a fluid conduit which is circular in vertical section when the ring and drum are in index position as shown in FIG. 6. This embodiment also permits continuous fluid flow at all positions of rotation of the ring around the drum.

In order to have fluid flow through the swivel of this invention, regardless of the position of the ring on the drum, the fluid conduit should rise for a distance at least the diameter of the fluid conduit per each revolution but it should not rise close to or more than two diameters because then there will be very limited or no fluid flow at some portions during rotation of the ring on the drum.

FIGS. 7 to 10 illustrate another embodiment of the invention. In this embodiment, the first member is plate 70 and the second member is plate 71. Each of plates 70 and 71 is shaped like a circular disc with horizontal top and bottom parallel surfaces and a hole 72 in the center. Spiral fluid conduit 73 is defined by two matching but opposing spiral raceways. One raceway 74 is in the top of plate 70 and the other raceway 75 is in the bottom of plate 71. Seals 76 are positioned on each side of fluid conduit 73 to prevent leakage. Clamp means, not shown, is used to hold plates 70 and 71 rotatably together.

Inlet conduit 77 communicates smoothly with one end of fluid conduit 73 and outlet conduit 78 communicates smoothly with the other end of fluid conduit 73. As a result, when the two plates are indexed as shown in FIGS. 7 to 9, the fluid conduit 73 has a smooth bore, circular in lateral cross-section, through which a pig can move unobstructively. A second outlet conduit 79 can be placed in plate 71 to communicate with the fluid conduit 73 to thereby facilitate removal of fluid when the swivel rotates substantially out of the index position.

FIG. 10 illustrates the various cross-sectional shapes of the fluid conduit 73 as the top plate 71 is rotated while the lower plate 70 is stationary. The angle degrees adjacent to the top plate indicate the degrees of clockwise rotation of the top plate from the index point or position as shown in FIG. 7. It can be readily seen from FIG. 10 that a continuous fluid conduit is maintained during complete rotation of plate 71 relative to plate 70 so that fluid can flow into the swivel and out at all swivel angle positions.

The third embodiment of the invention illustrated by FIG. 11 has a lower plate 90 with a central hole 91 and a top plate 92 with a central hole 93. Lower plate 90 has in its top a conical face 94 which mates with conical face 95 in the bottom of top plate 92.

Spiral fluid conduit 96 is formed by opposing matching raceways 97 and 98 in conical faces 94 and 95 respectively. The spiral fluid conduit is thus similar to fluid conduit 73 in the second embodiment. Seals 99 are placed on each side of fluid conduit 96 to prevent leakage of fluid between conical faces 94 and 95. Clamp means, not shown, is used to rotatably secure plates 90 and 92 together. Inlet conduit 100 communicates with one end of fluid conduit 96 and outlet conduit 101 communicates with the other end of the fluid conduit 96. In this embodiment it is generally preferred to have plate 90 stationary and to rotate plate 92. During such rotation a continuous fluid conduit 96 is maintained since the fluid conduit will take forms very similar to those illustrated by FIG. 10.

Figure 12:
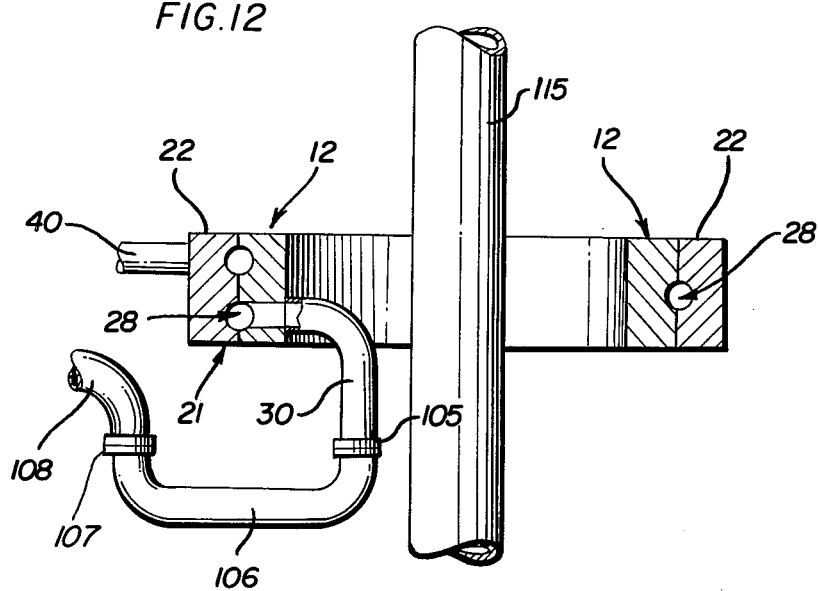
FIG. 12 is an elevational view of a fluid-swivel similar to FIG. 2 but with the drum partially rotatable.
Figure 13:
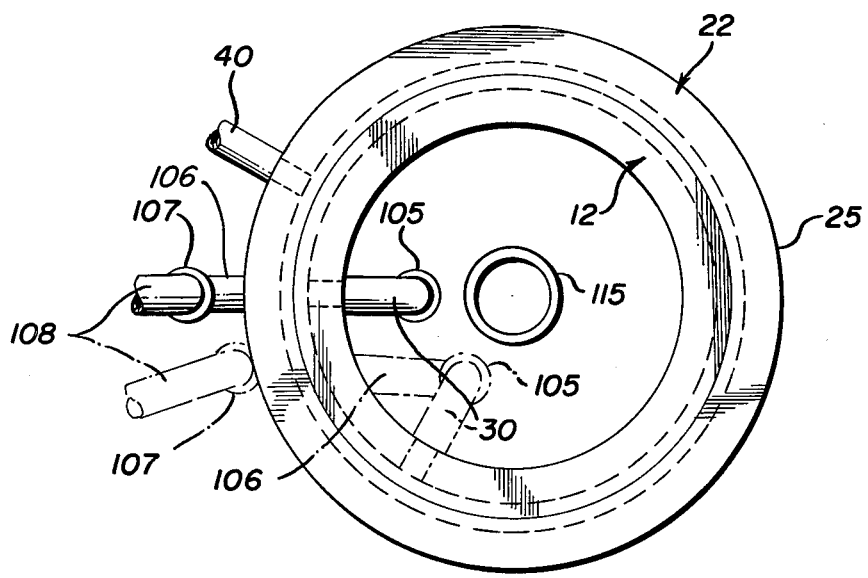
FIG. 13 is a plan view of the fluid-swivel of FIG. 12.

FIGS. 12 and 13 illustrate a further embodiment of the invention which substantially employs the fluid-swivel arrangement already illustrated by FIGS. 1 and 2. The embodiment of FIGS. 12 and 13, however, not only permits the ring 21 to rotate but also the drum 12 to a limited extent. Thus, the inlet conduit 30 is connected to a swivel 105 from which conduit 106 extends to swivel 107. Conduit 108 then leads away from swivel 107 to be connected to a suitable joint. FIG. 13 illustrates in phantom how drum 12 can be rotated due to the swivels 105 and 107 positioned in the inlet feed line. By providing the drum 12 with a capability to be rotated it is much easier to index the drum and ring for a pigging operation rather than to move the ship or vessel to reach the desired index point. It should be understood that the ring 12 of the embodiment shown in FIGS. 12 and 13 can rotate 360°. The vertical center pipe 115 passing through the center of the fluid-swivel can be used as an independent fluid flow line for loading or unloading a ship or vessel.

The system shown in FIGS. 12 and 13 can also be used on the ring instead of the drum when the drum is the primary rotating member, and it does not make any difference whether the inlet or outlet is on the drum or the ring. The system can also be used in the embodiments of the invention illustrated by FIGS. 7 to 11.

The described fluid-swivel embodiments can be used to convey liquids, gases and liquefied gases such as crude oil, fuel oil, natural gas and liquefied natural gas.

It should be understood with respect to the invention that all of the piggable fluid-swivel embodiments shown herein can be used in conjunction with an axially positioned fluid line having its own conventional swivel, thereby providing a multi-line fluid loading or unloading system. Furthermore, the fluid-swivels of this invention can be mounted one above or around the other to obtain a multi-line fluid handling system.

The foregoing detailed description has been given for clearness of understanding only, and no unnecessary limitations should be understood therefrom as modifications will be obvious to those skilled in the art.

What is claimed is:

1. A fluid-swivel comprising:
    a first member having a first face,
    a second member having a second face adjoining and mating with the first face of the first member,
    means operatively positioning and holding the first member and the second member to rotate relative to each other about a common axis and with the first face and second face positioned to rotate relative to each other in operative arrangement,
    a fluid conduit defined by a first raceway in the first face and a second raceway in the second face, with said second raceway being exactly opposite the first raceway when the first and second raceways are at a predetermined index point relative to each other,
    said fluid conduit at the indexed condition defining a path in one revolution about the common axis which advances the conduit a distance of at least one width of the conduit,
    sealing means preventing fluid flow between the first face and the second face and thereby out of the fluid-swivel,
    an inlet conduit communicating with the fluid conduit, and
    an outlet conduit communicating with the fluid conduit.

2. A fluid-swivel according to claim 1 in which the inlet conduit communicates with an inlet end of the fluid conduit and the outlet conduit communicates with an outlet end of the fluid conduit.

3. A fluid-swivel according to claim 1 in which the fluid conduit is a spiral with a uniform pitch from inlet to outlet.

4. A fluid-swivel according to claim 1 in which the inlet conduit communicates with the fluid conduit through the first member, and the outlet conduit communicates with the fluid conduit through the second member.

5. A fluid-swivel according to claim 4 in which the inlet conduit or the outlet conduit has swivel means which permits the first member or the second member with which it communicates to be at least partially rotated to facilitate indexing the first and second members for pigging.

6. A fluid-swivel according to claim 1 in which the fluid conduit has a non-uniform pitch from inlet to outlet.

7. A fluid-swivel according to claim 1 in which the sealing means is a seal is located on each side of the fluid conduit to restrain fluid flow between the first face and the second face.

8. A fluid-swivel according to claim 1 in which a second outlet is located about 180° from the first outlet.

9. A fluid-swivel according to claim 1 in which the fluid conduit is circular in section in the indexed position and the inlet and outlet are circular and have a diameter substantially the same as the diameter of the fluid conduit.

10. A fluid swivel according to claim 6 in which the fluid conduit has a stepped portion which displaces the path of the fluid conduit about one diameter.

11. A fluid-swivel according to claim 1 in which at the predetermined index point the fluid conduit defined by the first and second faces provides a smooth bore through which a pig can travel in a circular path from the inlet to the outlet.

12. A fluid-swivel comprising:
a drum having a peripheral circular wall,
a raceway in, and extending completely around, the circumference of the drum wall,
a ring coaxially positioned around the drum and having an internal circular wall in mating contact around the drum wall,
means operatively positioning and holding the drum and the ring to rotate relative to each other about a common axis and with the drum wall and the ring wall positioned to rotate relative to each other in operative arrangement,
one of the drum and the ring being in stationary position during fluid flow and the other being rotatable,
a raceway in, and exending completely around, the ring internal wall,
the raceways in the drum and the ring defining a fluid conduit,
the raceways in the drum and the ring being opposite and matching each other when the drum and ring are at a predetermined index point relative to each other thereby forming the fluid conduit circular in radial vertical section through the drum and ring,
said fluid conduit at the indexed condition defining a path in one revolution which advances the conduit a distance of at least one conduit diameter in a direction axial to the drum and ring,
sealing means preventing fluid flow between the drum wall and the ring wall and thereby out of the fluid swivel,
an inlet conduit communicating with the fluid conduit, and
an outlet conduit communicating with the fluid conduit.

13. A fluid swivel according to claim 12 in which the inlet conduit communicates with the fluid conduit through the drum, and the outlet conduit communicates with the fluid conduit through the ring.

14. A fluid-swivel according to claim 10 in which the inlet conduit communicates tangentially with the fluid conduit at the index point, and the outlet conduit communicates tangentially at the index point with the fluid conduit but in a direction opposite to the inlet conduit.

15. A fluid swivel according to claim 12 in which the fluid conduit is a spiral with a uniform pitch from inlet to outlet.

16. A fluid swivel according to claim 12 in which the fluid conduit has a non-uniform pitch from inlet to outlet.

17. A fluid swivel according to claim 12 in which the drum and ring mating walls are parallel to the drum and ring axis.

18. A fluid swivel according to claim 12 in which a seal is located on each side of the fluid conduit to restrain fluid flow between the mating drum and ring walls.

19. A fluid swivel according to claim 12 in which the sealing means is a second outlet is located about 180° from the first outlet and the second outlet is normal to the fluid conduit.

20. A fluid swivel according to claim 12 in which the inlet and outlet have a diameter substantially the same as the diameter of the fluid conduit.

21. A fluid swivel according to claim 16 in which the fluid conduit has a stepped-up portion which displaces the path of the fluid conduit about one diameter about the drum and swivel coaxis in an angle of up to about 270°.

22. A fluid swivel according to claim 16 in which the fluid conduit has a stepped-up portion which displaces the path of the fluid conduit about one diameter about the drum and swivel coaxis in an angle of up to about 180°.

23. A fluid swivel according to claim 12 in which the inlet conduit is in the drum and the outlet conduit is in the ring.

24. A fluid-swivel according to claim 12 in which the inlet conduit or the outlet conduit has swivel means which permits the ring or the drum with which it communicates to be at least partially rotated to facilitate indexing the ring and drum for pigging.

25. A fluid-swivel according to claim 12 in which at the predetermined index point the fluid conduit defined by the first and second faces provides a smooth bore through which a pig can travel in a circular path from the inlet to the outlet.

26. A fluid-swivel comprising:
a first plate having a first face,
a second plate having a second face adjoining and mating parallel with the first face of the first plate,
means operatively positioning and holding the first member and the second member to rotate relative to each other about a common axis perpendicular to the first and second faces and with the first face and second face positioned to rotate relative to each other in operative arrangement,
a spiral conduit defined by a first raceway in the first face and a second raceway in the second face, with said second raceway being exactly opposite the first raceway when the first and second raceways are at a predetermined index point relative to each other, said fluid conduit at the indexed condition defining a path in one revolution about the common axis which advances the conduit a distance of at least one width of the conduit, sealing means preventing fluid flow between the first face and the second face and thereby out of the fluid-swivel, an inlet conduit communicating with the fluid conduit, and an outlet conduit communicating with the fluid conduit.

27. A fluid-swivel according to claim 26 in which the inlet conduit communicates with an inlet end of the fluid conduit and the outlet conduit communicates with an outlet end of the fluid conduit.

28. A fluid-swivel according to claim 26 in which the fluid conduit is circular in section in the indexed position and the inlet and outlet are circular and have a diameter substantially the same as the diameter of the fluid conduit.

* * * * *

UNITED STATES PATENT AND TRADEMARK OFFICE
CERTIFICATE OF CORRECTION

PATENT NO. : 4,183,559
DATED : January 15, 1980
INVENTOR(S) : Donald Claude Stafford and John Stephen Andrepont It is certified that error appears in the above-identified patent and that said Letters Patent are hereby corrected as shown below:

Column 1, line 63, change "30°" to --360°--; Claims 7 and 19, line 2, delete the second occurrence of "is".

Signed and Sealed this

Twenty-second Day of April 1980

[SEAL]

Attest:

SIDNEY A. DIAMOND

Attesting Officer

Commissioner of Patents and Trademarks